United States Patent [19]

Gasaway

[11] 3,714,428
[45] Jan. 30, 1973

[54] MARKER FOR RADIOLOGY
[76] Inventor: Vincent T. Gasaway, 915 S. Lafayette, Chanute, Kans. 66720
[22] Filed: Aug. 10, 1970
[21] Appl. No.: 62,277

[52] U.S. Cl. ................................. 250/59, 250/61.5
[51] Int. Cl. ............................................. G01b 15/00
[58] Field of Search ............................. 250/59, 61.5

[56] References Cited

UNITED STATES PATENTS 3,509,337  4/1970  De Clerk et al. .................... 250/61.5

Primary Examiner—William F. Lindquist
Attorney—Don M. Bradley

[57] ABSTRACT

A radiolucent member having equally spaced sloping, stepped edges with radio-opaque numerals on the upwardly facing step surfaces corresponding to the measured distance of each step from a reference surface. The member is adapted for positioning over a film for automatically recording the height of the visible plane appearing on the film when exposed to radiation from a source as the source and film carrier are moved simultaneously relative a predetermined line lying in the plane. The image of the indicium located closest to the plane is visible on the film while the remaining indicia are obscured.

6 Claims, 5 Drawing Figures

PATENTED JAN 30 1973 3,714,428
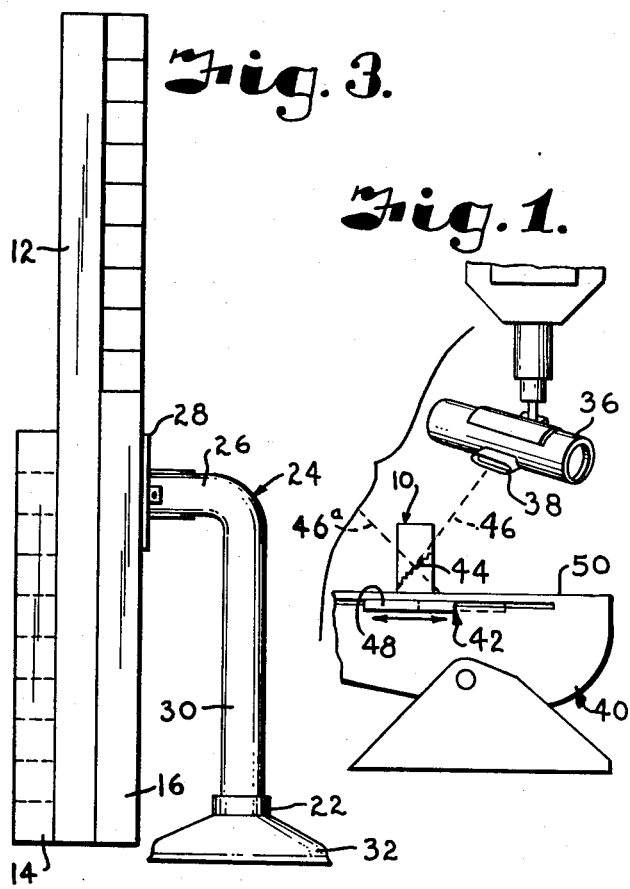
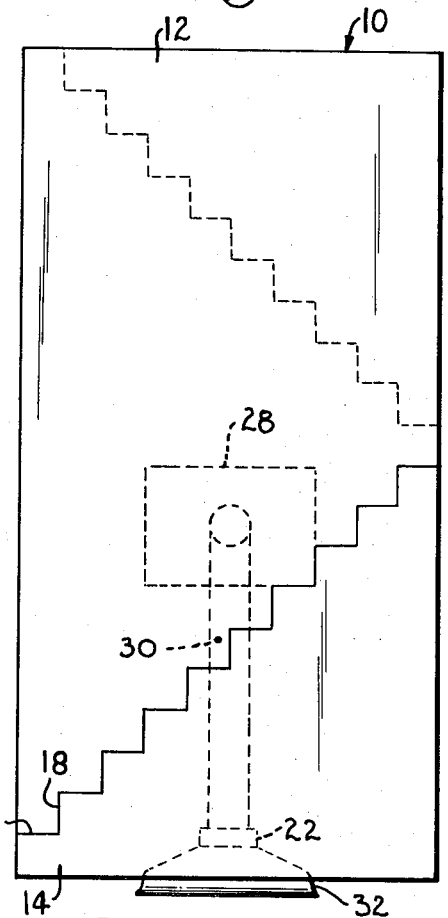
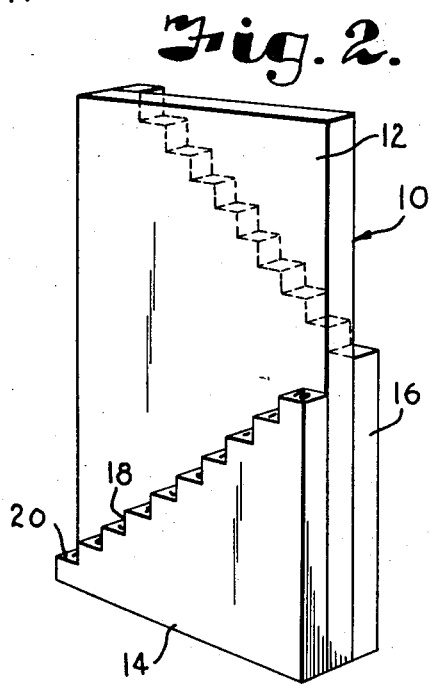
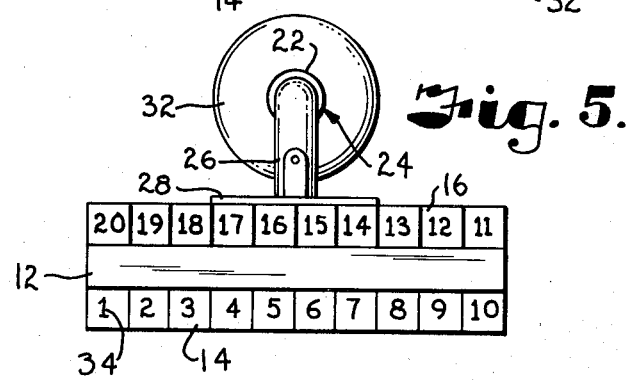
INVENTOR.
Vincent T. Gasaway
BY Don M Bradley
ATTORNEY

MARKER FOR RADIOLOGY

This invention relates to radiology equipment, and more particularly, to a marker for automatically indicating on a film the location of the visible plane appearing on the film exposed in certain radiological procedures.

It is common in the use of radiology to analyze the patient by means of planograms. These are film recorded pictures showing objects or phenomena lying along a plane through the patient's body. The radiation source and the film carrier are usually coupled together by linkage for movement of both simultaneously about a predetermined line or fulcrum of movement disposed between the source and film. The items lying in a particular plane passing through the fulcrum line are recorded visibly on the film while relative movement between the source and carrier blur or otherwise obscure the items which are not positioned on or near the plane of interest. This procedure is obviously useful for examination and evaluation of phenomena of interest internally of the patient where it is impossible to physically position the film.

Heretofore, it has been necessary to label or otherwise mark the film so that the precise positional relationship of the observable phenomena is known when the films are evaluated. Since the elevation of the plane of recorded observable information may be and usually is varied from picture to picture, and since items not situated at or near the plane are not visible on the picture, the ordinary practice of positioning radio-opaque identification data on a margin of the film for automatic recording is not appropriate. Separate recording of the data for subsequent association with the picture is time consuming and also subject to errors which may adversely affect the diagnosis and treatment.

Accordingly, it is a primary object of this invention to provide a marker which automatically and accurately records the positional data of the observable information on pictures obtained through procedures of this kind.

Another object of the invention is to provide a marker which is easy to use and which does not require more than the bare minimum of operator training or attention.

Still a further object of the invention is to provide such a marker which can be easily and economically fabricated from readily available materials so that the benefits of the invention can be available to users on a widespread basis.

These and other important objects of the invention will be further explained or will be readily apparent from the drawing, description and the claims.

In the drawing:

FIG. 1 is a fragmentary side elevational view on a reduced scale of radiology equipment used in procedures of the type described and showing the general position for the marker of this invention when used with this equipment;

FIG. 2 is a perspective view of a marker embodying the principles of this invention, some obscured parts appearing in phantom;

FIG. 3 is an enlarged, end elevational view of the marker of FIG. 2, the obscured steps appearing in phantom;

FIG. 4 is a side elevational view thereof, obscured parts appearing in phantom; and FIG. 5 is a top plan view thereof shown on a reduced scale.

A marker embodying the principles of this invention is broadly designated in the drawing by the reference numeral 10 and comprises a radiolucent member 12 sandwiched between a pair of rectangular, substantially planar members 14 and 16 which are also of radiolucent material.

Member 14 has an upper edge comprising a series of equally spaced ascending steps 18. The steps 18 are preferably disposed in a relatively straight diagonal line extending from the lowermost corner of member 14 to the uppermost opposite corner as illustrated clearly in the drawing. Each step has a substantially horizontal uppermost surface 20 and member 14 is configured so that its uppermost surface 20 is disposed near the mid range between the top and bottom of member 12.

Member 16 is similar to member 14 but the stepped edge of member 16 is disposed on the opposite side of member 12 and extends upwardly from the middle of member 12 in a substantially straight diagonal path back toward the uppermost opposite corner of member 12. It will be understood that the stepped edges of members 14 and 16 comprise horizontal and vertical segments arranged in zig-zag fashion as best illustrated in FIGS. 2 and 4 but that the uniformity of the spacing between each adjacent pair of horizontal and vertical surfaces present a "straight" rather than a curvilinear contour for the path defined by the successive step surfaces.

In the embodiment of the invention chosen for illustration, means 22 is provided for releasably securing marker 10 to a support surface. Means 22 includes a generally L-shaped element 24 having a leg 26 secured to a bracket 28 which is secured by adhesive or other means to the proximal side of member 16. The other leg 30 of element 24 is integral with leg 26 and extends in substantial parallelism downwardly toward the lowermost end of marker 10. A suction cup 32 is carried by the end of leg 30 in position for releasably engaging a supporting surface to support the marker in an upright position.

Each of the upwardly facing step surfaces 20 for members 14 and 16 respectively are provided with radio-opaque indicia 34. Preferably, the lowermost surface 20 of member 14 is disposed a definite distance above a reference plane which may be the supporting surface for marker 10. The next succeeding step surface 20 is disposed a definite distance above the preceding step surface and its corresponding indicium corresponds to the measured distance between the respective surfaces and the reference plane. Similarly, each successive step surface is provided with its particular radio-opaque indicium designating the vertical distance of such surface from the reference plane.

In the preferred embodiment, the lowermost step surface is exactly 1 centimeter from the reference plane or supporting surface. The arabic numeral one formed of radio-opaque material such as lead or the like is either supported on the step surface or is formed in a corresponding indentation in the step surface. Similarly, the next successive step surface is 2 centimeters from the reference plane and is provided with an indicium of radio-opaque material forming the arabic numeral two. Each step surface of the series of step surfaces is successively 1 additional centimeter from the reference plane than the immediately preceding step surface. The indicia are numerals corresponding precisely to the elevations for the respective step surfaces and are each of radio-opaque material.

The direction of the ascending steps of member 16 is reversed from the corresponding direction for the steps of member 14 to minimize the space required for the marker. It will, of course, be apparent to those skilled in the art that the marker could be made from one radiolucent member having a continuous stepped edge providing all of the step surfaces corresponding to the range between the lower and upper margins of the marker. It will also be apparent that, if desired, and in the interest of economies of construction, the intermediate member 12 is not absolutely required. In other words, the proximal, facing surfaces of members 14 and 16 could be secured directly to one another, the only requirement being that the respective indicium be disposed in offset relationship so that each is exposed from a position above the marker.

In this regard, and as will be further explained hereinafter, the indicium could conceivably be encased in radiolucent material so long as the incremental vertical spacing and offset relationship between the radio-opaque indicia is maintained.

Marker 10 is adapted for use in radiographic procedures. Equipment commonly used for procedures of this type is shown fragmentarily in FIG. 1. It includes a movable source of radiation 36 having a lens 38 and positioned in overlying relationship to a table 40. Linkage (not shown) conventionally interconnects source 36 with a movable support 42 for sensitized film. The linkage is constructed so that movement of the source in a horizontal direction over table 40 results in movement of the support 42 in the opposite direction. In effect, a fulcrum or pivot between the movement of source 36 and the movement of support 42 occurs along a horizontal line between the source and the film and extending perpendicular to the directions of movement of the source and film. This fulcrum line or pivot point is designated by the reference numeral 44 in FIG. 1. The dotted line 46-46a indicates the line of focus of the energy radiating from source 36 toward the sensitive film 48 carried by support 42. Manifestly, the lens 38 of source 36 is articulated to direct the energy toward the film throughout the range of movement of the source and the film.

The equipment may be adjusted so that the line 44 is at any predetermined elevation above the supporting surface 50 of table 40. Normally, a patient is positioned on surface 50 overlying the film 48 and the source 36 is moved while exposing the film to radiation through the patient. The picture when film 48 is developed contains visible images of the phenomena located at the elevation of the fulcrum line 44 but the phenomena at higher and lower elevations are blurred as a result of the relative movement of the film and source.

In use, marker 10 is positioned in overlying relationship to film 48 and in the field of exposure to radiation from source 36. Normally, this position will be immediately adjacent the patient. The indicium positioned on the step surface most closely adjacent the position of line 44 is recorded visibly on the film while the remaining indicia are blurred as a result of this relative movement between the source and film. Since the visible indicium is a numeral corresponding to the elevation of the step surface, the elevation of the visible phenomena or things recorded on the film is automatically marked on the film. It is not necessary for the operator to separately record each elevation at which the planogram was taken nor is it necessary to make further calculations to determine the location of the recorded phenomena from the reference plane.

Obviously, the indicia could be any type precoded or distinctive markings which would reveal the critical information to those reading the film. Further, the spacing between successive indicium need not necessarily be uniform or measured in centimeters. Nevertheless, such uniform spacing and centimeter measurements are convenient in medical procedures of this kind.

The material from which members 12, 14 and 16 is made is radiolucent to permit relatively unobstructed passage of radiation with only the image of the appropriate radio-opaque indicium appearing on the film. Any of a variety of materials such as wood or plastic may be used for this purpose.

The supporting means might comprise a magnet attached to the marker or, depending upon the configuration chosen for the marker, might even be a flattened or appropriately shaped lowermost surface of the marker itself. Any suitable leg arrangement could also be used consistent with supporting the member so that the vertically spaced, offset radio-opaque indicia are positioned properly to appear on the film and to correctly reflect the critical elevation of the visible recorded data.

Having thus described the invention, what is claimed as new and desired to be secured by Letters Patent is:

1. For use in radiographic procedures utilizing a source of X-radiation and an X-radiation-sensitive film, the source and the film being movable about a predetermined line disposed between the source and film to produce a visible image only of objects lying on a plane passing through said line, a marker for indicating the location of said plane relative to a reference surface having a known position parallel to the plane of said film and said plane passing through said line, said marker comprising:

a radiolucent member having an upwardly facing edge adapted to be positioned within the field of radiation and overlying the film, said edge presenting a plurality of contiguous steps in vertically planar alignment having a plurality of upwardly facing surfaces at different elevations, each of said elevations corresponding to a possible location of said plane vertically of said reference surface; and a series of radio-opaque indicia disposed on said surfaces, each indicium designating a particular surface on which it is located whereby the indicium closest to the plane when the film is exposed to the radiation is recorded on the film while the remaining indicia are blurred as a result of movement of the source and film.

2. The invention of claim 1, wherein said member is provided with a second one of said edges, the indicia for one of said edges being at higher elevations than the indicia for the other edge.

3. The invention of claim 2, wherein each stepped edge is configured to present a slope extending at an angle from the vertical, and wherein the slopes of said edges extend in opposite directions.

4. The invention of claim 1, and means associated with the member for supporting the latter in a predetermined position with respect to said reference surface.

5. The invention of claim 4, wherein said supporting means includes a suction cup adapted to be releasably secured to said reference surface, and means securing said suction cup to the member.

6. The invention of claim 5, wherein said securing means comprises an L-shaped element, one end of said element being secured to the member intermediate the ends of the latter and projecting outwardly therefrom, the suction cup being secured to the other end of the element.

* * * * *